Patented Apr. 21, 1953

2,636,048

UNITED STATES PATENT OFFICE 2,636,048

METHOD OF PRODUCING TRIALKYL PHOSPHATE ESTERS

Arthur Dock Fon Toy, Chicago, Ill., assignor to Victor Chemical Works, a corporation of Illinois No Drawing. Application April 7, 1949, Serial No. 86,111

13 Claims. (Cl. 260—461)

This invention relates to a process of producing substantially pure trialkyl phosphates, and relates particularly to the production of neutral alkyl phosphates having at least eight and preferably eight to twelve carbon atoms in the alkyl group.

A variety of methods have been proposed for the production of trialkyl phosphates from the reaction of phosphorus oxychloride and an aliphatic alcohol. These have been directed to the improvement in yields by removing hydrogen chloride or otherwise preventing the deleterious action of hydrogen chloride upon the reaction products. Yields have been generally low when long chain alkyl groups have been employed.

The trialkyl phosphates when produced from prosphorus oxychloride and alcohol always contain as impurities organic acid esters and chloroalkyls which are the result of side reactions of alcohol and alkyl acid phosphates and hydrogen chloride. These reactions are more pronounced at higher temperatures such as those encountered when attempting to purify the higher alkyl phosphates by distillation.

I have found that the above difficulties encountered in the production of the higher alkyl phosphates may be avoided and a substantially pure ester product obtained by employing the following procedure: Phosphorus oxychloride is slowly added to the selected aliphatic alcohol in a suitable reaction vessel while maintaining a reaction temperature not greater than about 35° C. until the addition is completed, the amount of the alcohol employed being in at least stoichiometric proportion, but preferably in excess, generally about 100% excess, for example. The reaction mixture is then heated preferably to about 60° to 70° C. for several hours to complete the reaction and drive off the major proportion of the liberated hydrogen chloride by bubbling air through the mixture under reduced pressure. The reaction mixture is then heated under vacuum at a temperature sufficient to distill off the excess unreacted alcohol, and the residual crude liquid ester product is contacted with an anion exchange material whereby the acid esters and other acidic impurities are adsorbed leaving the substantially pure liquid trialkyl phosphate ester product. To facilitate the treatment of the crude ester product with the anion exchange material, the crude viscous liquid ester is preferably diluted with a low boiling solvent, such as ethanol, which may be readily removed from the purified ester, after treatment with the anion exchange material, by distillation at a temperature sufficiently low to avoid any appreciable thermal decomposition of the ester product.

The anion exchange material employed in the process is preferably but not necessarily of the type produced by condensation of formaldehyde with an aryl amine to form a solid resin material. Suitable commercial anion exchange materials are the "Amberlite" IR3 and IR4 resins produced by the Resinous Products and Chemical Company, the "Duolite" A-2, A-3, produced by Chemical Process Company, or "De-Acidite" produced by the Permutit Company.

The resins may be regenerated for reuse in the process in the usual manner such as by treating the spent resin with a dilute solution of a base such as sodium carbonate, caustic soda, and the like and washing to remove excess base from the resin material.

The following are specific examples of the method employed and the trialkyl phosphate esters obtained and are given for clearness of understanding only.

Example 1

76.8 grams (0.5 mol) of phosphorus oxychloride was slowly added to 3 mols nonyl alcohol at less than 30° C. and then heated at 60° to 65° C. for 3½ hours in one case and 4½ hours in the second case, aspirating the mixture with dry air. The excess nonyl alcohol was distilled off up to 100° C. at 1 or 2 mm. A quantity of the crude trinonyl phosphate was mixed with approximately twice its weight of formula 30 alcohol (95% commercial 95% ethanol, 5% methanol) and passed through a column of an aldehyde-amine resin. The material was passed through the column twice in one case and four times in the second case. The excess alcohol was then distilled off. The results are tabulated below:

| | Initial Acidity [1] | No. of passes through resin | Final Acidity [1] | Percent Yield |
|---|---|---|---|---|
| 1 | 2.77 | 2 | 0.12 | 87.8 |
| 2 | 4.35 | 4 | 0.12 | 88.5 |

[1] Ml. N/10 NaOH/gram sample titrated.

Several samples of trinonyl phosphate thus prepared were distilled under a very high vacuum using a mercury vapor pump. It was found that the whole sample distilled without decomposition and without leaving a residue indicating the high purity of the product. The substantially pure trinonyl phosphate prepared in the above manner had an index of refraction $n_D^{25}=1.4485$ and analyzed 6.45% P compared to the theoretical amount of 6.52%.

Other examples were carried out in which the crude ester was diluted with ethanol-water mixtures, water, and acetone-water mixtures. Because of insoluble nature of the higher alkyl phosphate esters dilution with water-solvent mixtures resulted in the formation of emulsions. While this increased the difficulty of the purification step, it was possible to remove the acidic constituents by contacting the emulsion with the anion exchange material and then remove the solvent-water mixture by distillation. The purpose of diluting the crude ester with a solvent is simply that of producing a less viscous liquid to facilitate the passage of the ester through the bed of anion exchange material and is not a critical feature of the process.

*Example 2*

310 g. (1.6 mol) of redistilled commercial lauryl alcohol with an average molecular weight of 194 was reacted with 40.8 g. (0.266 mol) phosphorus oxychloride at 30° to 32° C. Dry air was blown through the material at a reduced pressure to remove the evolved hydrochloric acid gas. The excess lauryl alcohol was distilled off up to 150° C. at one millimeter pressure. The crude trilauryl phosphate had an acidity equivalent of 1.8 ml. N/10 NaOH/gram. The crude ester was dissolved in formula 30 alcohol and passed through a formaldehyde-amine resin column the equivalent of three times. The trilauryl phosphate ester of the following physical properties was obtained:

$n_D^{25}=1.4500$
P=4.83%
Calculated P=4.85%
Acidity=0.23 ml. N/10 NaOH/g.
Yield=92.6%

The above preparation of trilauryl phosphate is the first time so far as I know that trilauryl phosphate has been prepared in substantially pure form and in commercially feasible yields.

Trialkyl phosphates of at least eight and preferably eight to twelve carbon atoms in each alkyl group are useful as plasticizers for vinylite resin.

The above described process of purifying the higher trialkyl phosphate esters may also be satisfactorily used for the purification of the lower alkyl esters. In the case of the higher alkyl phosphates the purification step is applicable to any crude trialkyl phosphate having eight or more carbon atoms in the alkyl group and containing acid phosphate ester impurities. The examples illustrate the preferred range of eight to twelve carbon atoms alkyl, but this limitation is not critical with respect to the purification step.

The foregoing description is given for clearness of understanding only and the invention is not limited thereby but is to be construed broadly within the spirit and scope of the appended claims.

I claim:

1. The method of producing a trialkyl phosphate ester which comprises reacting phosphorus oxychloride with an aliphatic alcohol under approximately anhydrous condition, removing the liberated hydrogen chloride and excess alcohol and contacting the liquid reaction mixture with an anion exchange resin whereby acid esters and acidic impurities are adsorbed leaving a substantially pure trialkyl phosphate ester.

2. The method of claim 1 wherein the aliphatic alcohol contains eight to twelve carbon atoms.

3. The method of producing a trialkyl phosphate ester which comprises reacting phosphorus oxychloride with an aliphatic alcohol under approximately anhydrous conditions, removing the liberated hydrogen chloride and excess alcohol, contacting the liquid reaction mixture with an anion exchange resin in the presence of a volatile organic solvent whereby acid esters and acidic impurities are adsorbed and removing the organic solvent by distillation thereby leaving a substantially pure trialkyl phosphate ester.

4. The method of claim 3 wherein the organic solvent is ethyl alcohol.

5. The method of producing a trialkyl phosphate ester which comprises adding phosphorus oxychloride to an excess of an aliphatic alcohol under approximately anhydrous conditions while maintaining a reaction temperature of not over 35° C. until the addition is completed and a large proportion of the evolved hydrogen chloride is removed, heating the mixture at a temperature of 60° to 70° C. to substantially complete the liberation of hydrogen chloride, distilling off the excess alcohol under vacuum, diluting the reaction mixture with a low boiling organic solvent and contacting the diluted mixture with an anion exchange material and removing the low boiling solvent by distillation thereby leaving a substantially pure trialkyl phosphate ester.

6. The method of claim 5 wherein the aliphatic alcohol contains eight to twelve carbon atoms.

7. The method of claim 5 wherein the low boiling organic solvent is ethyl alcohol.

8. The method of purifying a crude trialkyl phosphate ester containing acid ester and acidic impurities which comprises, contacting the crude ester with an anion exchange material whereby the acidic impurities are adsorbed leaving a substantially pure trialkyl phosphate ester.

9. The method of claim 8 wherein said crude ester is diluted with a low boiling solvent prior to contacting with said anion exchange material.

10. The method of producing a trinonyl phosphate ester which comprises, adding phosphorous oxychloride to an excess of nonyl alcohol under approximately anhydrous conditions while maintaining a reaction temperature of not over 35° C. until the addition is completed and a large proportion of the evolved hydrogen chloride is removed, heating the mixture at a temperature of 60° to 70° C. to substantially complete the liberation of hydrogen chloride, distilling off the excess alcohol under vacuum, diluting the reaction mixture with a low boiling organic solvent and contacting the diluted mixture with an anion exchange material and removing the low boiling solvent by distillation leaving a substantially pure trinonyl phosphate ester.

11. The method of purifying a crude trinonyl phosphate ester which comprises, contacting the crude ester with an anion exchange material whereby the acidic impurities are adsorbed leaving a substantially pure trinonyl phosphate ester.

12. The method of producing a trilauryl phosphate ester which comprises adding phosphorus oxychloride to an excess of lauryl alcohol under approximately anhydrous conditions while maintaining a reaction temperature of not over 35° C. until the addition is completed and a large proportion of the evolved hydrogen chloride is removed, heating the mixture at a temperature of 60° to 70° C. to substantially complete the liberation of hydrogen chloride, distilling off the excess alcohol under vacuum, diluting the reaction mixture with a low boiling organic solvent and contacting the diluted mixture with an anion exchange material and removing the low boiling solvent by distillation thereby leaving a substantially pure trilauryl phosphate ester.

13. The method of purifying a crude trilauryl phosphate ester which comprises, contacting the crude ester with an anion exchange material whereby the acidic impurities are adsorbed leaving a substantially pure trilauryl phosphate ester.

ARTHUR DOCK FON TOY.

References Cited in the file of this patent

UNITED STATES PATENTS

| Number | Name | Date |
|---|---|---|
| 1,844,408 | Nicolai | Feb. 9, 1932 |
| 2,005,619 | Graves | June 18, 1935 |
| 2,285,855 | Downing | June 9, 1942 |
| 2,340,331 | Knutson et al. | Feb. 1, 1944 |

FOREIGN PATENTS

| Number | Country | Date |
|---|---|---|
| 330,228 | Great Britain | June 2, 1930 |

OTHER REFERENCES

McCready et al., J. Am. Chem. Soc., vol. 66, pp. 560–563, 1944.